A. J. COLWELL AND A. T. KENNEY.
PLOW LIFT FOR TRACTORS.
APPLICATION FILED OCT. 18, 1916.
1,315,286.
Patented Sept. 9, 1919.
3 SHEETS—SHEET 1.
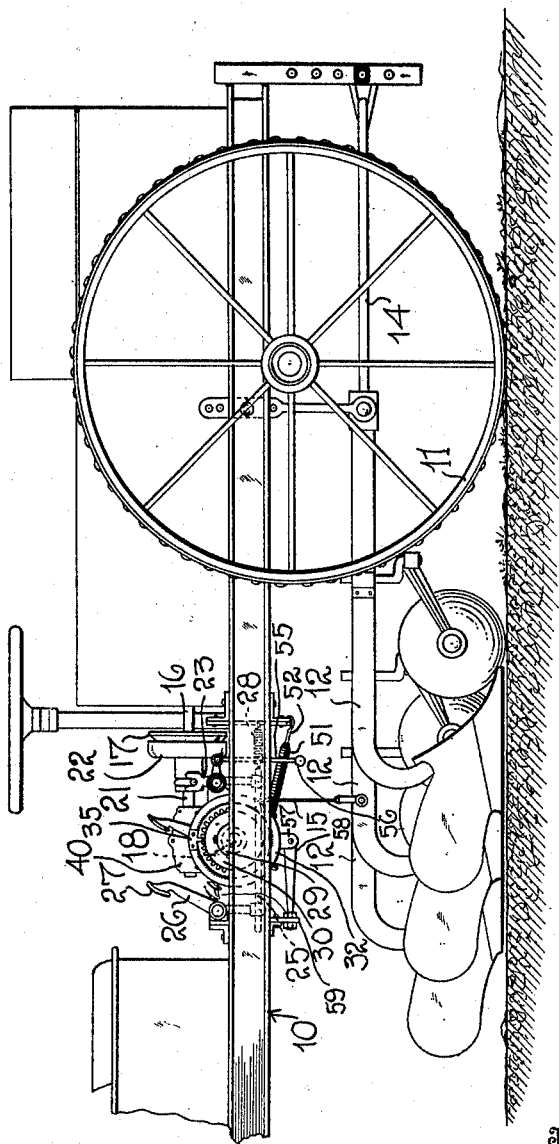
Inventors
A. J. COLWELL
A. T. KENNEY
By Watson E. Coleman
Attorney

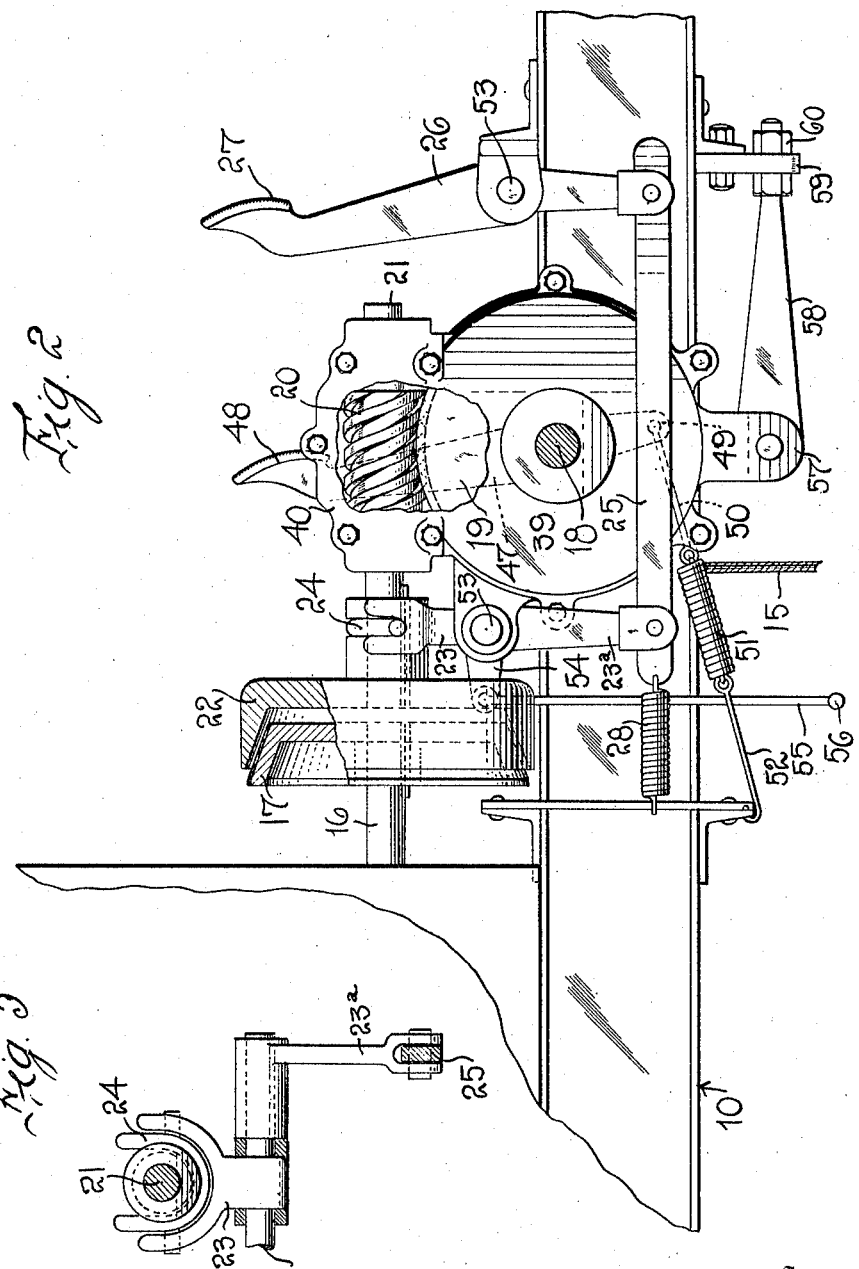

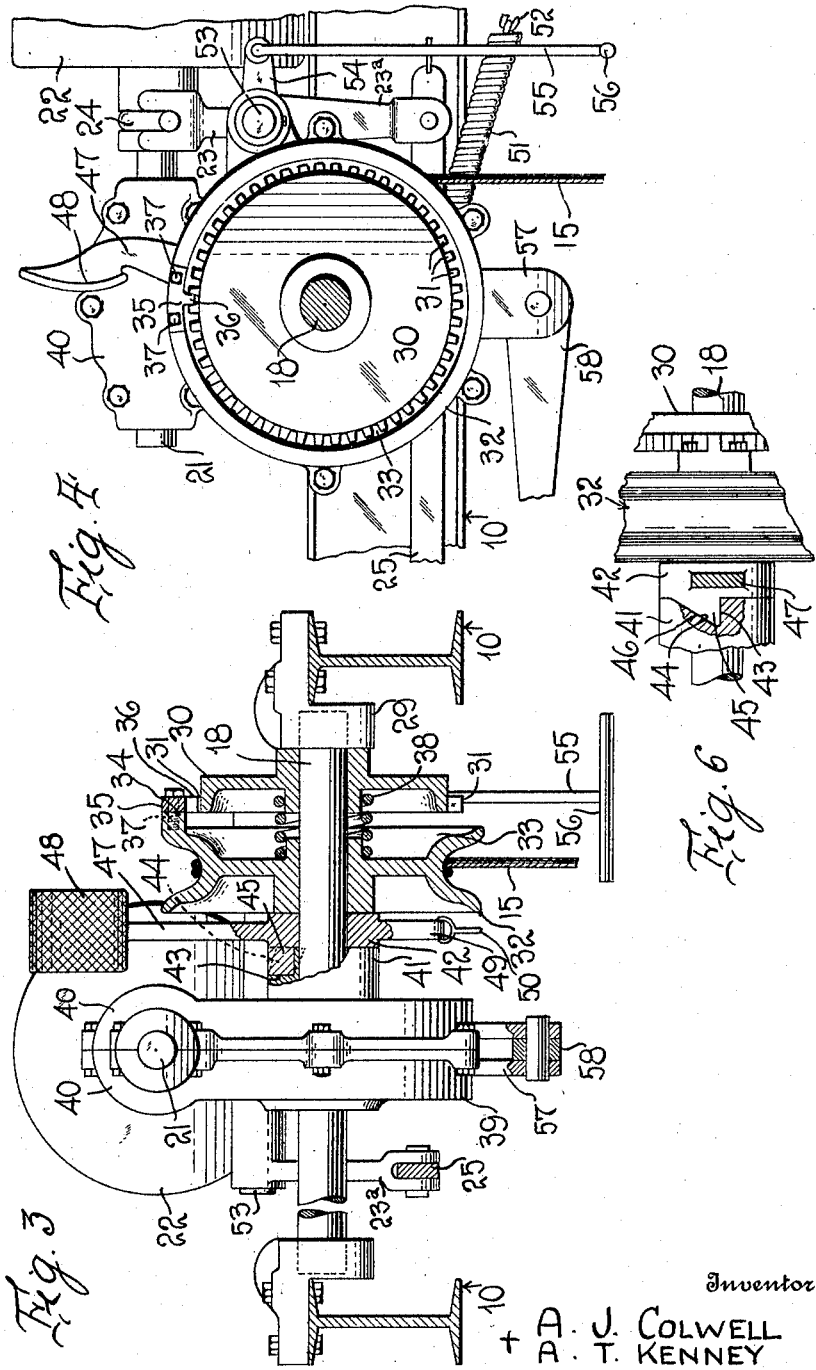

UNITED STATES PATENT OFFICE.

ALVAH J. COLWELL AND ALBERT T. KENNEY, OF NORFOLK, NEBRASKA.

PLOW-LIFT FOR TRACTORS.

1,315,286.          Specification of Letters Patent.       Patented Sept. 9, 1919.

Application filed October 18, 1916. Serial No. 126,362.

*To all whom it may concern:*

Be it known that we, ALVAH J. COLWELL and ALBERT T. KENNEY, citizens of the United States, residing at Norfolk, in the county of Madison and State of Nebraska, have invented certain new and useful Improvements in Plow-Lifts for Tractors, of which the following is a specification, reference being had to the accompanying drawings.

This invention relates to tractor plows, cultivators or like machines and particularly to mechanism for raising or vertically adjusting the plow beams of supporting frames carrying plows, cultivators or other ground engaging implements.

One object of the invention is to provide means whereby the power of the traction engine may be used for raising the beams or frame and in this connection to provide means for automatically disconnecting the operative connection between the plow supporting beams and the motor-driven mechanism of the tractor when the beams or frame have been raised a predetermined degree.

Still another object is to provide means for holding the beams or frame raised and for releasing said holding means when desired.

Still another object is to provide a very simple mechanism actuated by pedals under the control of the driver of the tractor whereby the plows or other ground engaging members may be raised by the action of the motor and whereby the means holding the plows raised may be released to permit the plows to descend.

Other objects of this invention will appear in the course of the following description.

Our invention is illustrated in the accompanying drawings, wherein:

Figure 1 is a side elevation of a portion of a tractor provided with our plow lift;

Fig. 2 is a side elevation of the plow lifting mechanism partly in section and partly broken away;

Fig. 3 is a rear elevation partly in section;

Fig. 4 is a side elevation from a direction opposite to the view point in Fig. 2;

Fig. 5 is a fragmentary elevation partly in section of the means for shifting the clutch member 22; and Fig. 6 is a fragmentary view of the winding reel and the fixed hub 41, the hub being broken away to show the wedging engagement of the coil 42 with the hub.

Referring to these drawings, 10 designates the frame of the tractor, this frame being supported by a rear wheel and by forward traction wheels 11 which are operatively engaged by a motor mounted upon the frame and of any suitable design. Means for steering the machine and for turning the traction wheels was fully illustrated in Patent No. 1,170,877, granted on the 8th day of February, 1916. Disposed beneath the frame of the tractor are a plurality of plow beams 12 which, as illustrated, are connected to each other and rotatably connected to a draw bar 14 in turn connected to the forward end of the tractor. The specific manner of connecting the plow beams to the tractor is of no moment as regards the present invention, it being sufficient for the purposes of the present invention that the plow beams are pivotally mounted at their forward ends so that the rear ends of the plow beams may be raised or lowered. These beams 12, which I shall hereafter refer to as plow beams may carry any suitable earth working elements and are not limited to use with plows.

As before stated the plow beams or the frame supporting the plows are connected to each other so that all the blades may be raised or lowered together and for the purpose of raising the rear ends of the plow beams, I provide a cable 15 which is connected to operating mechanism now to be described. The shaft 16 is the motor shaft and carries upon it the fixed clutch member 17 which is shown as a friction clutch. Mounted upon the transverse shaft 18, suitably supported in bearings upon the frame of the tractor is a worm wheel 19 which is engaged by a worm 20 mounted upon a shaft 21 supported in suitable bearings, this shaft carrying upon it a sliding clutch member 22 which confronts the clutch member 17 and may be shifted into or out of operative engagement therewith. The sliding clutch member 22 is splined upon the shaft 21 and is shifted by means of a shifter lever 23 pivotally supported upon the housing of the worm wheel 19, the upper end of this lever 23 being operatively connected to a suitable shipper ring 24 and the offset lower end 23ᵃ of the lever 23 being connected to a link rod 25 which extends rearward and is pivotally connected to the lower end of the trip lever 26 pivotally supported in suitable bearings and having a treadle 27 at its upper end. The forward end of the link rod 25 is connected to a contractile spring 28 whose other end is connected to any suitable member of the frame. It will be obvious that when the treadle 27 is pushed forward the link rod 25 will be drawn rearward which, through the lever 23, will push the clutch member 22 into engagement with the clutch 17, thus operatively connecting the worm shaft 21 to the driving shaft 16, this of course driving the worm wheel 19 and the shaft 18.

Mounted to rotate with the shaft 18 and disposed against a bearing bracket 29 mounted upon the adjacent frame beam of the tractor is a wheel 30 which is dished and formed upon its periphery with a series of teeth 31. Loosely mounted upon the shaft 18 is a wheel 32 having the function of a winding drum, this wheel having a concave periphery and being operatively engaged with the cable 15 so that when the wheel turns in one direction the cable will be wound up and when turned in the other direction the cable will be unwound. The outer side face of this wheel 32 is dished or recessed as at 33 and at one point this wheel is provided with a lug 34 upon its outside face. Disposed upon this lug 34 is a relatively short plate 35 having an inwardly projecting tooth 36 adapted to mesh with the teeth 31 of the wheel 30. This plate 35 is held in place by screws 37. A coiled compression spring 38 is engaged at one end with the hub of the wheel 32 and at the other end with the hub of the wheel 30 and this compression spring exerts its force to urge the wheel 32 away from the wheel 30.

The worm wheel 19 is inclosed within a housing 39 which is preferably formed in opposed sections connected to each other by screws but may be formed in any other suitable manner, this housing being so formed as to inclose the worm 20, the extensions 40 of the side plates of the housing 39 forming a housing for this worm. The housing 39 is provided with a hub portion 41 which extends toward the hub of the wheel 32, the confronting ends of these hubs being spaced from each other. Loosely surrounding the shaft 18 and disposed in the space between the hub of the wheel 32 and the hub 41 is a collar 42. The hub 41 at one point in its periphery is cut away as at 43, one end of this cut away portion having a cam face 44 which is inclined. The collar 42 is formed with an outward projection 45, the face 46 of which is inclined and confronts the inclined face 44 of the recess 43. The collar 42 has an arm 47 extending upward from it which carries a treadle 48 and opposite the arm 47 the collar 42 is provided with an arm 49 which is connected by a link 50 to a contractile spring 51 in turn connected by a link 52 to any suitable part of the tractor frame. Thus when the treadle 48 is depressed or shifted forward it will be against the force of the spring 51 and when the pressure is released the spring 51 will return it to its normal position. When the treadle 48 is forced forward the projection 45 will engage the cam face 44 and this will cause the collar 42 to be shifted laterally against the wheel 42, forcing this wheel 42 laterally toward the wheel 30 against the spring 38. The extent of movement of the wheel 32 will be sufficient to carry the tooth 36 out of engagement with the teeth 31 and hence the wheel 32 will be free to rotate independently of the shaft 18. When the wheel 32 is in its normal position however, the tooth 36 will mesh with the teeth on the wheel 30 and the shaft 18 and wheel 30 and the wheel 32 will all rotate together.

Now, if it be desired to raise the plows, the treadle 27 is pushed forward which forces the clutch members 17 and 22 into engagement and causes the rotation of the worm wheel, the shaft 18 and, through wheel 30, the wheel 32, thus winding up on the cable 15 and lifting the plows. Now it is necessary to provide some means whereby the clutch members 17 and 22 will be disconnected automatically when the plow beams have been raised a suitable distance. To this end the treadle lever 26 is mounted upon a shaft 53 which is mounted in suitable bearings upon the frame of the machine, this shaft oscillating with the clutch lever. Clamped upon the shaft 53 is an arm 54 (see Fig. 4) and pivotally connected to the extremity of this arm is a trip rod 55 which depends from the arm 54 and at its lower end is provided with a head 56 which extends transversely of the plow beams. Now when the plow beam rises to a predetermined point it will strike the lower end of the trip rod and shift the trip rod in a reverse direction so as to disengage the clutches 17 and 22.

It may be noted at this time that it is possible to do without this automatic trip device but in this case reliance must be placed upon the skill of the operator and his ability to release the clutch before the plow beam is drawn upward too far inasmuch as the plow beam is below the frame of the machine it is not possible for the operator to see the plow beam and therefore accidents would be liable to happen were it not for this automatic trip device which exerts a force upon the treadle lever 26 in a direction reverse to the force exerted by the operator's foot and positively acts to throw the lever 26 to a releasing position even against force applied on the treadle 27.

The operation of this invention is obvious from what has gone before. Assuming that the plow beams or the plow supporting frame is in its lowered position and it be desired to raise it, then the clutch pedal 27 is forced forward which throws the clutch into engagement, transmitting power to the winding drum or wheel 32, thus winding up the cable 15 and raising the plows. When the plows have been raised a predetermined amount, the trip rod 55 will be struck which will cause the unclutching of the motor shaft from the worm shaft. Inasmuch as the worm wheel 19 cannot move in a reverse direction because of its engagement with the worm 20 it is obvious that the wheel 30 will be held from movement and the wheel 32 will be held from unwinding movement because of its engagement with the teeth 31. If it be now desired to lower the blades, the treadle 48 is pushed forward which causes the cam faces of the collar 42 and the hub 41 to engage with each other thus shifting the wheel 32 laterally until its tooth 36 is out of engagement with the teeth 31, whereupon the wheel 34 will immediately run free against the friction of the spring 38 until the plows have been lowered. When the plows have been lowered a sufficient degree, the pedal 48 is released whereupon the winding wheel 32 is again stopped by intermeshing engagement with the wheel 30. While this invention is not limited to any particular manner of forming the bearings for supporting the shaft 18, or the shaft 53, I have shown these bearings as formed by brackets 29, these brackets being adapted to rest upon the upper flanges of the eye beams forming the frame of the tractor and being bolted thereto and in order to support the housing 39 rigidly and without strain on the shaft 21, I have illustrated the housing as being provided with the downwardly extending arm 57 connected to a pivot bolt 58, which bolt passes through the transversely extending bar 59 or any other suitable portion of the frame of the tractor, the bolt being engaged by opposed nuts 60.

This invention is very simple in its operation and thoroughly effective for the purpose designed. By its means the power of the tractor is used for raising plows supported beneath the tractor and this permits heavier plow beams and heavier plows to be used than would be possible were it necessary to raise or lower the plow beams by hand. This device is being tested and has been found to be thoroughly effective and convenient.

Having described our invention, what we claim is:

1. A lifting mechanism including a power shaft, a drive shaft, manually operable means for connecting and disconnecting the power shaft and drive shaft, a driven shaft operatively connected to the drive shaft, a winding drum, and manually operable means for positively connecting the driven shaft to the winding drum for common rotation.

2. A lifting mechanism including a power shaft, a drive shaft, coacting clutch members on the power shaft and the drive shaft manually shiftable into or out of engagement with each other, a driven shaft operatively connected to the drive shaft, a winding drum, coacting clutch members mounted on the winding drum and the driven shaft and shiftable into or out of engagement with each other, one of said clutch members having a tooth and the other having a recess into which said tooth may be shifted whereby to positively connect the clutch members for common rotation.

3. A lifting mechanism including a power shaft, a drive shaft, manually operable clutch members shiftable into or out of engagement with each other, a worm mounted on the drive shaft, a driven shaft, a worm wheel carried on the driven shaft and engaging said worm, a winding drum loosely rotatable upon the driven shaft, and a clutch member on the driven shaft manually shiftable into or out of engagement with the winding drum, the clutch member having a tooth engaging with the winding drum to positively lock the winding drum and clutch for common rotation.

4. A lifting mechanism including a power shaft having a clutch member thereon, a drive shaft having a coacting clutch member thereon, manually operable means for shifting the clutch members into or out of engagement with each other, a worm mounted upon the drive shaft, a transversely extending driven shaft, a worm wheel mounted on the driven shaft engaged by said worm, a winding drum loosely mounted on the driven shaft and longitudinally shiftable thereon, a clutch member mounted on the driven shaft for rotation therewith and having a tooth adapted to positively engage the winding drum for common rotation when the winding drum is shifted against the clutch member, and manually operable means for laterally shifting the winding drum into engagement with the clutch member.

In testimony whereof we hereunto affix our signatures in the presence of two witnesses.

ALVAH J. COLWELL.
ALBERT T. KENNEY.

Witnesses:
L. P. PASEWALK,
E. R. KOERBER.